(12) United States Patent
Vyas et al.

(10) Patent No.: US 9,870,314 B1
(45) Date of Patent: Jan. 16, 2018

(54) UPDATE TESTING BY BUILD INTROSPECTION

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/376,097

(22) Filed: Dec. 12, 2016

(51) Int. Cl.
G06F 9/44 (2006.01)
G06F 11/36 (2006.01)

(52) U.S. Cl.
CPC ...... G06F 11/3688 (2013.01); G06F 11/3664 (2013.01); G06F 11/3692 (2013.01); G06F 11/3672 (2013.01)

(58) Field of Classification Search
CPC ............. G06F 11/3688; G06F 11/3664; G06F 11/3672; G06F 11/3692
See application file for complete search history.

(56) References Cited

U.S. PATENT DOCUMENTS

| | | | | |
|---|---|---|---|---|
| 5,634,098 A * | 5/1997 | Janniro | ............... | G06F 11/3688 707/999.104 |
| 6,405,364 B1 | 6/2002 | Bowman-Amuah | | |
| 6,421,822 B1 * | 7/2002 | Pavela | ................ | G06F 11/3664 714/E11.208 |
| 6,502,102 B1 * | 12/2002 | Haswell | .............. | G06F 11/3664 |
| 6,725,399 B1 * | 4/2004 | Bowman | ............. | G06F 11/3664 714/38.14 |
| 7,158,907 B1 * | 1/2007 | Soldo | .................. | G06F 11/3684 702/108 |
| 7,552,361 B2 | 6/2009 | Galler et al. | | |
| 7,958,400 B2 | 6/2011 | Ur | | |
| 8,522,083 B1 * | 8/2013 | Cohen | ................. | G06F 11/3672 714/38.1 |
| 8,732,676 B1 | 5/2014 | Kolawa et al. | | |
| 8,843,412 B2 * | 9/2014 | Paliwal | ............... | G06F 11/3664 705/50 |
| 9,032,369 B2 | 5/2015 | Balakrishnan et al. | | |

(Continued)

OTHER PUBLICATIONS

J Li et al., "Adjusting multiple testing in multilocus analyses using the eigenvalues of a correlation matrix", [Online], 2005, pp. 1-7, [Retrieved from Internet on Sep. 11, 2017], <https://gump.qimr.edu.au/general/daleN/SNPSpD/Li2005.pdf>.*

(Continued)

*Primary Examiner* — Ziaula A Chowdhury
(74) *Attorney, Agent, or Firm* — K&L Gates, LLP

(57) ABSTRACT

The present disclosure provides new and innovative methods and systems for ordering tests in an application update environment. For example, an update to an application may be received. A file name of a file affected by the update may be detected. A correlation matrix, which associates file names and the test names with correlations based on test metrics, may be queried with the file name to return a correlation between the file name and a test. A test plan may be built based on the correlation between the detected file name and the test, and may include an ordered list based on correlations from the correlation matrix. The test plan may then be run. A test failure and test metric of a test may be detected and the correlation matrix may be updated with a correlation between the file name and the failed test based on the test metric.

20 Claims, 7 Drawing Sheets

(56) References Cited

U.S. PATENT DOCUMENTS

| | | | | |
|---|---|---|---|---|
| 9,218,269 | B2* | 12/2015 | Dolinina | G06F 11/3672 |
| 2004/0103394 | A1* | 5/2004 | Manda | G06F 11/3688 |
| | | | | 717/126 |
| 2005/0223361 | A1 | 10/2005 | Belbute | |
| 2006/0179363 | A1* | 8/2006 | LaBanca | G06F 11/2257 |
| | | | | 714/57 |
| 2008/0126867 | A1* | 5/2008 | Pandarinathan | G06F 11/3688 |
| | | | | 714/37 |
| 2008/0270992 | A1* | 10/2008 | Georgieva | G06F 8/60 |
| | | | | 717/127 |
| 2010/0192006 | A1* | 7/2010 | Gharat | G06F 11/3688 |
| | | | | 714/5.1 |
| 2011/0145793 | A1 | 6/2011 | Alexander et al. | |
| 2011/0314343 | A1* | 12/2011 | Hoke | G06F 11/3672 |
| | | | | 714/45 |
| 2012/0246621 | A1* | 9/2012 | Mukkavilli | G06F 11/3684 |
| | | | | 717/126 |
| 2013/0332777 | A1* | 12/2013 | Howard | G06F 11/3692 |
| | | | | 714/38.1 |
| 2014/0181590 | A1* | 6/2014 | Wefers | G06F 11/3688 |
| | | | | 714/38.1 |
| 2014/0245067 | A1* | 8/2014 | Agarwal | G06F 11/3692 |
| | | | | 714/38.1 |
| 2014/0364984 | A1* | 12/2014 | Gadzinski | G06F 11/3692 |
| | | | | 700/105 |
| 2016/0062765 | A1* | 3/2016 | Ji | G06F 8/75 |
| | | | | 717/122 |

OTHER PUBLICATIONS

Nicholas J. Horton et al. "Review of Software to Fit Generalized Estimating Equation Regression Models", [Online], 1999, pp. 160-169, [Retrieved from Internet on Sep. 11, 2017], <https://www.researchgate.net/profile/Nicholas_Horton/publication/2391452_Review_0fcfd5100a6f0d7af0000000.pdf>.*

Peter H. Westfall et al., "Multiple Tests for Genetic Effects in Association Studies", [Online], 2002, pp. 143-168, [Retrieved from Internet on Sep. 11, 2017], <https://pdfs.semanticscholar.org/ac9c/a38e242697e1f0fef08d29699cb275520f46.pdf>.*

Shapiro, Ellen, Travis CI Tutorial: Getting Started, Sep. 11, 2015 (19 pages) Link: https://www.raywenderlich.com/109418/travis-ci-tutorial.

Eyl et al., Fast Feedback from Automated Tests Executed with the Product Build, Dec. 10, 2015 (4 pages) Link: http://link.springer.com/chapter/10.1007/978-3-319-27033-3_14.

Bowman, Kevin, Dynamic Queues Testing in DevTest, Apr. 7, 2016 (3 pages) Link: https://communities.ca.com/thread/241751644.

* cited by examiner

000# UPDATE TESTING BY BUILD INTROSPECTION

BACKGROUND

The present disclosure relates generally to testing application updates. Typically, when an application is updated, the application update may be subject to tests by a development system before the update is incorporated into the application. While the development system is running a first set of tests on an application update, the system is preoccupied with that update and additional updates (e.g., those made by other programmers) cannot be tested until the first set of tests conclude. Each test may take a few seconds or a few minutes to run, and the full set of tests may include hundreds of tests. Tests may be run in a random order or alphabetically based on test name. Build servers may run every test in the full set of tests to ensure that the update works under all conditions.

SUMMARY

The present disclosure provides new and innovative methods and systems for update testing in an application update environment such as a build server. In an example method, a plurality of files may be stored in a memory. The plurality of files may include a first file and a second file that are used by an application and each file in the plurality of files may have a file name. A plurality of tests may also be stored in the memory. The plurality of tests may include a first test and a second test that are used to test the application and each test in the plurality of tests may have a respective test name. A plurality of test results may also be stored in the memory. The plurality of test results may include a first test result, which may include a first file name of the first file. The first test result may have been updated by the application after a first update was applied to the application. The first test result may also include a first test name of the first test and a first test metric based on the first test. A correlation matrix may also be stored in the memory. The correlation matrix may associate the first file name and the first test name with a first correlation between the first file and the first test based on the first test metric.

A second update to the application may be received. The second update may include a first test profile including a first plurality of test names designated as test failure candidates. The first test profile may then be detected. A second file name of the second file may be detected. The second file is a file updated by the application after the second update is applied to the application. A second correlation between the second file and the second test may be detected by querying the correlation matrix with the second file name.

A first test plan may then be built based on at least the second correlation and the first test profile. The first test plan may include an ordered list of a second plurality of test names. The ordered list may include the second test name and the first plurality of test names, and the second test name and the first plurality of test names may be respectively ordered based on at least a plurality of correlations from the correlation matrix including the second correlation. The first test plan may then be run based on the ordered list. Then a first failure of the second test may be detected, and a second test result may be generated. The second test result may include the second file name, the second test name, and a second test metric based on the second test. The second correlation between the second file and the second test in the correlation matrix may be updated based on the second test metric.

Additional features and advantages of the disclosed method and apparatus are descried in, and will be apparent from, the following Detailed Description and the Figures.

DETAILED DESCRIPTION

Figure 1:
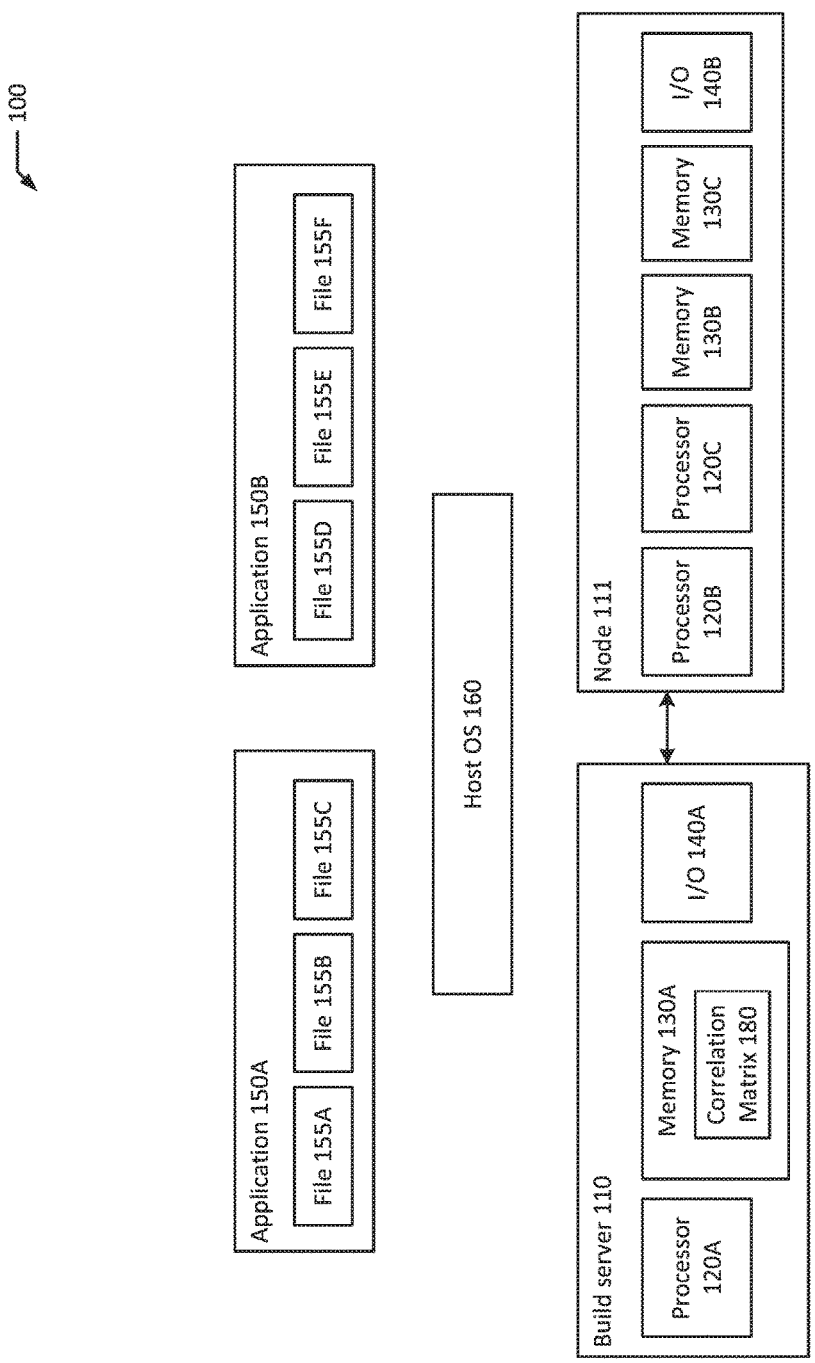
FIG. 1 is a block diagram of a build server system according to an example of the present disclosure.

When a software programmer updates an application, a subset, instead of all, of the code may be rewritten. This subset of code may be an application update. An application update typically undergoes a series of tests before the application update can be released. This testing may take place in a build and release system. A typical system may run a set of tests for each application update before the update is made a permanent change to the application. Typically, each application update may undergo hundreds of tests in a full set of tests and each test may take a few seconds to a few minutes to run. It may take hours to run through a full set of tests for an application update. When a test fails, the other tests in the full set of tests may continue to run despite the fact that a test has already failed indicating a problem with a given application update and these failures may occur at any time in the full set of tests. Accordingly, a programmer may become aware of a first failure after the conclusion of the full set of tests, or as each test failure occurs, which may be fifteen minutes into a test set, again an hour into a test set, again an hour and a half into a test set and again two hours into a test set. A continuous integration, or CI, may coordinate the testing of the application update and may need to pull down many repositories, build the repositories separately, and run tests using those repositories in order to run a single test, further increasing the length of time to run a full set of tests. A CI may be used in a federated and long running build and release system. The full set of tests may be ordered in a variety of ways such as randomly or alphabetically. This can lead to hours of time where the CI is running tests after a test failure before any additional test failures occur, preventing the programmer from fully understanding the scope of the failures until after the conclusion of the test set. Further, this may prevent the CI from testing additional application updates until after a full set of tests has been run and may slow down the entire system. Additionally, merely providing a test report upon failure of a given test may not be helpful as the failure could occur at any time in the hours of testing, such that the full scope of the failure may not become apparent until well into the test set.

The present disclosure addresses the above discussed problem by introspecting test results and building a correlation matrix that correlates test results with files affected by the application update. The correlation matrix then is used to build a test plan. The test plan may be ordered such that tests with a higher likelihood of failure, as determined by the correlation matrix, are run first. In other words, when a first application update affects a first file and the first application update fails a first test, when a second application update affects the same first file, the first test may be prioritized and run before other tests. This allows tests with a proven likelihood of failure to be run earlier in the test set, allowing the CI to test additional application updates after a first test failure. For example, a full set of tests may include one hundred tests. Of the one hundred tests, five may have a proven likelihood of failure, or additional test metric that may warrant that test being run sooner in a test set. In prior systems, the tests may have been ordered alphabetically or randomly, such that the five tests with a proven likelihood of failure may be run as test ten, test thirty, test fifty, test seventy and test ninety. With the systems and method of the present disclosure, tests with a proven likelihood of failure may be run before other tests, reducing the time to first failure. In an example where five tests have a proven likelihood of failure out of a one hundred test set, the tests with a proven likelihood of failure may be run first, as tests one through five. In another example, where a programmer may have specified additional tests to be prioritized, the five tests with a proven likelihood of failure may be run as test two, test four, test five, test seven and test eight, while the programmer specified tests may be run as test one, test three, and test six. Effectively, the present disclosure relates to increasing the likelihood of a fast build failure so that all tests do not have to be run or so a programmer can learn of and begin work fixing problems in the update earlier than if the tests had been ordered randomly and failures were spread out throughout the test. For example, a programmer may then become aware of all or substantially all of the test failures early in the test set, giving the programmer more time to address the problems detected in testing. Instead of running a full suite of build tests where tests with a proven likelihood of failure can be located at any point in the set of tests, an optimized set of tests can be run allowing a faster time to failure by consolidating the tests with a proven likelihood of failure earlier in the test set. By focusing testing resources on tests that are known test failure candidates, time to failure can be reduced thus streamlining the CI testing process.

Further, by tracking test metrics each time tests are run on application updates, the correlation matrix may include more and more information, effectively becoming better at predicting which tests are more likely to fail based on what files are affected by a given application update. Generally, the more iterations the system provides to the correlation matrix, the greater the optimization available for ordering future test plans.

The correlation matrix may associate a file name with a test name indicating a test metric which may be relevant for ordering a test plan. A file name may be any identifier that identifies a file. A test name may be any identifier that identifies a test. A test metric may include the occurrence of a test failure, a time to failure, a CPU usage, a thread-count, a memory usage with respect to the first test. By ordering a test plan based on test metrics, the time to failure for an application update can be reduced, thereby reducing the time spent waiting for failures. By reducing the time spent waiting for failures, problems with an update can be addressed sooner, streamlining the deployment process for an application update.

The test profile may include tests that the programmer identified as likely test failure candidates. The test profile may also include tests that the programmer would not have been able to identify, but that the correlation matrix indicates have already failed based on introspecting past test results for past application updates.

FIG. 1 depicts a high level system diagram of an example build server system 100 for managing the testing of application updates. Build server system 100 may include one or more processors 120A, one or more memories 130A, and an input/output device (I/O) 140A. Build server 110 may be connected to one or more nodes 111. Node 111 may include one or more additional processors 120B-C, memories 130B-C and I/O devices 140B for additional storage, processing or input capacity.

As used herein, physical processor or processor 120A-C refers to a device capable of executing instructions encoding arithmetic, logical, and/or I/O operations or commands. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Memory 130A may store files 155A-F, including the contents of files 155A-F and file names of files 155A-F. Memory 130A may store application 150A and files 155A-C associated with application 150A. Memory 130A may include tests that may be run by the build server to test a application update before the application update is included in application 150A, as well as the names of the tests. Additionally, applications and files, such as application 150B and files 155D-F may be stored on node 111, in for example, memory 130B. Alternatively, an application and files may be stored remotely.

The tests may vary depending on what type of application update is being received by build server 110. An example build server 110 may be a CI built as a set of Kubernetes® resources. For example, in a Kubernetes® system, TestDiskConflicts, TestAWSDiskConflicts, TestPodFitsSelector and TestNodeLabelPresence may be example tests.

A correlation matrix 180 may be located within the memory 130A of the build server 110. Correlation matrix 180 may include past test results, test names, names of files affected by past application updates.

Processors 120A-C may be interconnected using a variety of techniques, ranging from a point-to-point processor interconnects, to a system area network, such as an Ethernet-based network. Local connections within each node 110 and 111, including the connections between a processor 120A and a memory device 130A and between a processor 120A and I/O device 140A may be provided by one or more local buses of suitable architecture, for example, peripheral component interconnect (PCI).

Applications 150A-B may access files 155A-F. Applications 150A-B may be on node 111 in memory 130B-C, or applications 150A-B may be located remotely or in the cloud. Applications 150A-B may include one or more lines of source code, and the source code of the application may be updatable by a programmer via an application update.

Figure 2:
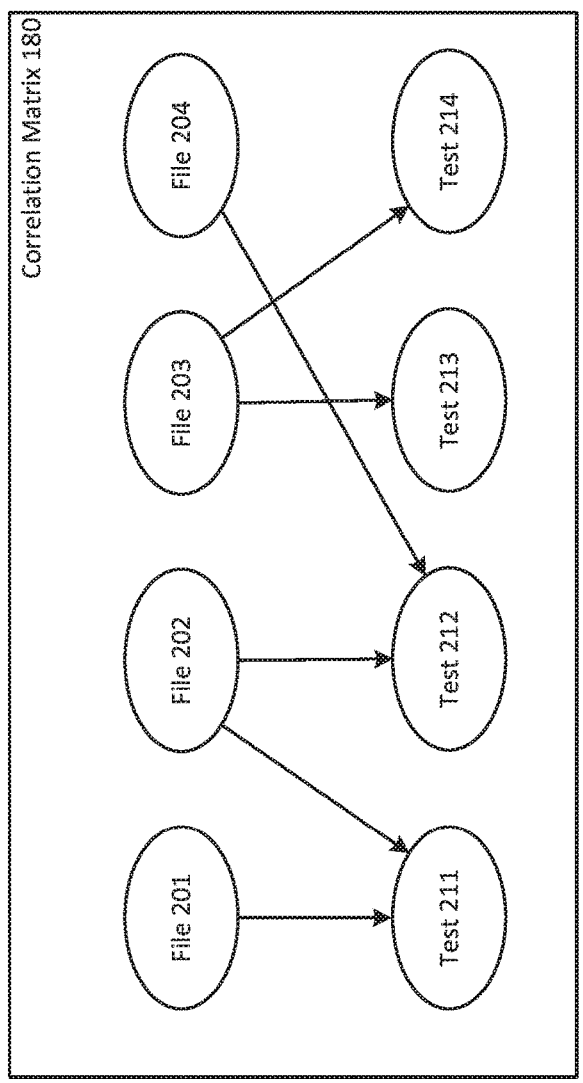
FIG. 2 is a block diagram of a correlation matrix according to an example of the present disclosure.

FIG. 2 is a block diagram of correlation matrix 180. Correlation matrix 180 may include the names of files 201, 202, 203, 204 and tests 211, 212, 213, 214. Correlation matrix 180 may be a database indicating what files 201-204 correlated to what tests 211-214, where the correlation may be associated with a test metric. For example, the test metric may be a test result indicating whether or not a test was failed after an application update affected a file. As illustrated in FIG. 2, test 211 failed after an application update affected file 201 and file 202, test 212 failed after an application update affected file 202 and 204, test 213 failed after an application update affected file 203, and test 214 failed after an application update affected file 203. Test metrics in correlation matrix 180 may also be the length of time to run a test successfully or a pass time, a change in length of time to run a test, the length of time to a test failure or a failure time, CPU utilization during a test, the number of threads used during a test, and how much memory was affected during a test.

Correlation matrix 180 may be a direct acyclic graph ("DAG"), where a file points to each test with a test metric associated with a change to the file. As a file 201 is affected by subsequent application updates, the correlation matrix 180 may be updated with additional test metrics. For example, a first application update affects file 201 and test 211 fails after three seconds. A second application update may affect file 201 and test 211 may fail after five seconds. The correlation between file 201 and test 211 may include two test metrics, for example, both the three second failure and the five second failure. Also, the correlation matrix 180 may include a correlation between file 201 and test 211 that averages the two test metrics such that the correlation indicates two test failures with an average failure time of four seconds. Correlation matrix 180 may also include differences between test metrics, such that if test 211 has been successfully run in five seconds, and a change to file 201 causes test 211 to run successfully in eight seconds, the correlation between file 201 and 211 may be a diff of three seconds. Correlation matrix 180 may include any other values or statistics relating to test metrics, including weights, distributions, frequencies, standard deviations, etc.

Figure 3A:
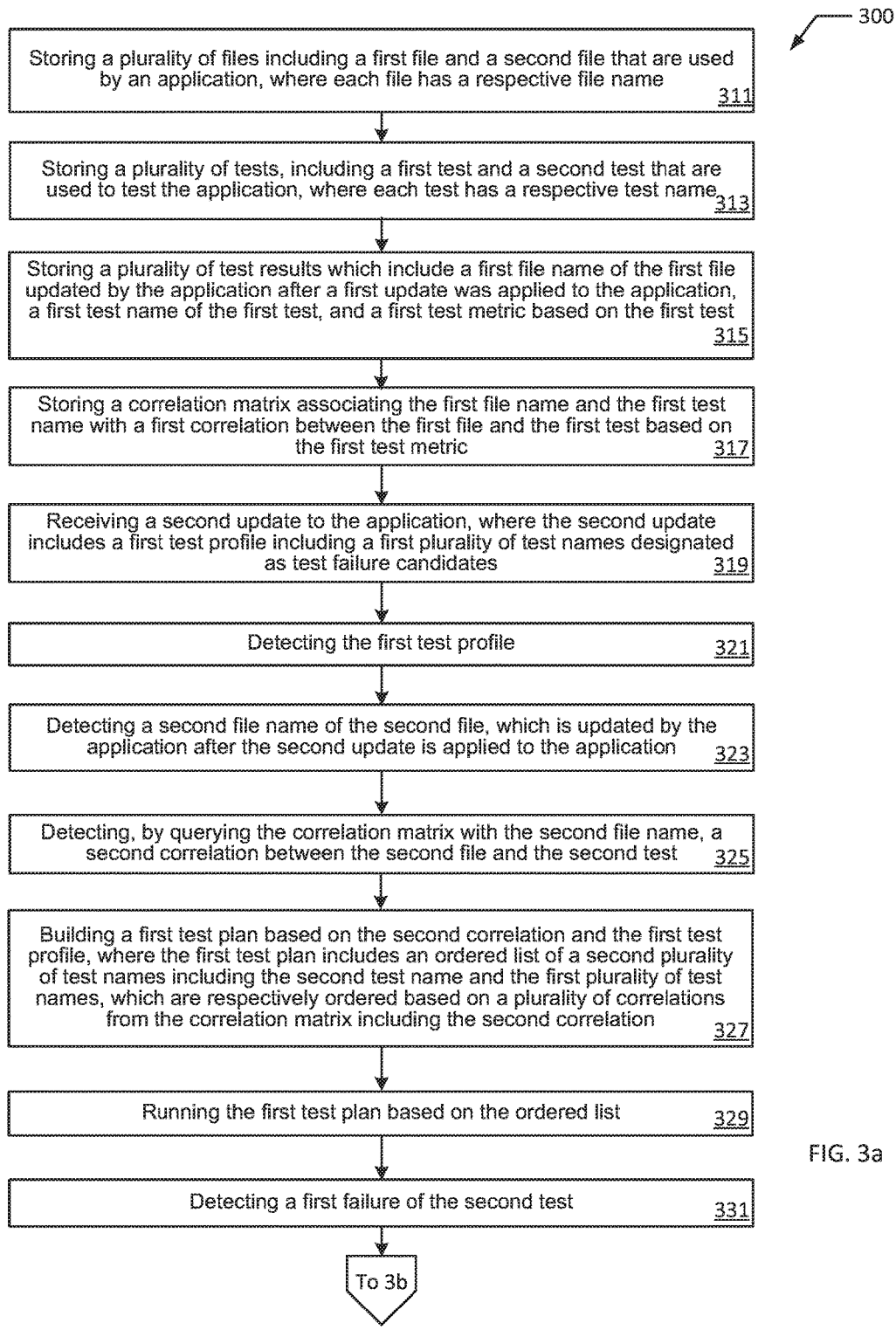
FIGS. 3a and 3b are flowcharts illustrating an example method for update testing by build introspection according to an example of the present disclosure.
Figure 3B:
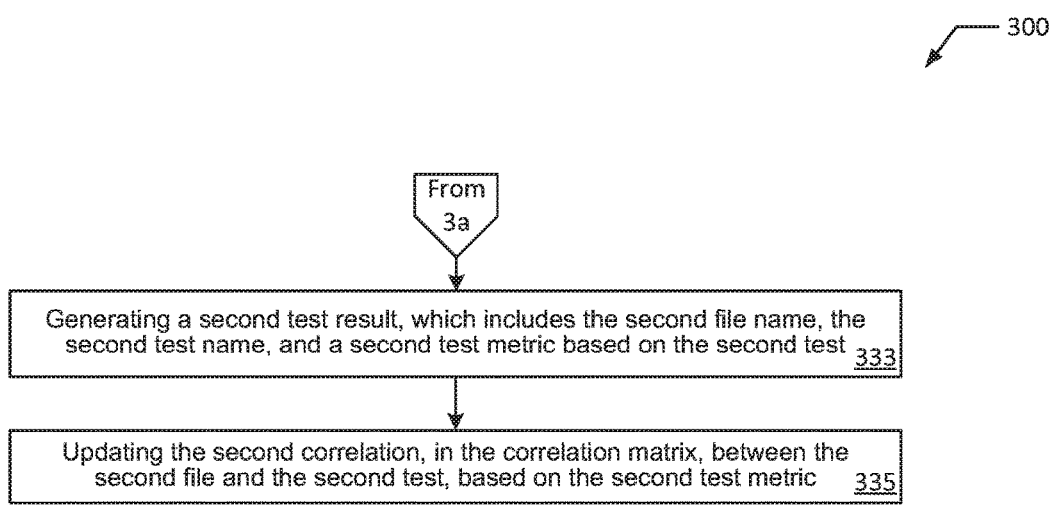

FIGS. 3a and 3b are a flow diagram illustrating an example method for updating testing by build introspection according to an example of the present disclosure. Although the example method 300 is described with reference to the flowcharts illustrated in FIGS. 3a and 3b, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both.

The example method 300 starts by storing a plurality of files including a first file and a second file that are used by an application, where each file in the plurality has a respective file name (block 311). For example, memory 130A may store file 155A and file 155B, and each stored file 155A-B may include a file name identifying the file. File 155A may be named Source_1 and file 155B may be named Destination_2. Application 150A may use file 155A as a location from which to receive data and file 155B as a location to send an output.

A plurality of tests, including a first test and a second test that are used to test the application are stored, where each test in the plurality of tests has a respective test name (block 313). For example, memory 130A may store two tests, the first test TestDiskConflicts, and the second test TestAWSDiskConflicts. Application 150A may be tested with the first and second tests before being released. Further, any update to application 150A may also undergo the first and second tests before being released.

A plurality of test results are stored in the memory, where the plurality of test results includes a first file name of the first file updated by the application after a first update was applied to the application, a first test name of the first test, and a first test metric based on the first test (block 315). For example, memory 130A may store one of the plurality of test results, including the name of the first file updated by an application update, Source_1; a first test name, TestDiskConflicts; and a first test metric based on the test, a failure after 5 seconds. Memory 130A may have received this information by introspecting prior tests run on build server 110 when a first application update was tested. The first application update may have been subject to a full test profile and may have affected file 155A Source_1.

A correlation matrix is stored in the memory, where the correlation matrix associates the first file name and the first test name with a first correlation between the first file and the first test based on the first test metric (block 317). For example, memory 130A stores correlation matrix 180, which may associate file name Source_1 with TestDiskConflicts with a failure after 5 seconds.

A second update to the application is received, where the second update includes a first test profile including a first plurality of test names designated as test failure candidates (block 319). For example, build server 110 may receive an update to application 150A. The update may include a list of test names that the programmer who wrote the update identified as test failure candidates. The programmer may have identified TestPodFitsSelector as a likely test failure candidate because the programmer believed that this test was likely to fail and may have wanted to optimize testing by running TestPodFitsSelector first. However, the programmer may not have been able to identify that the update would also likely fail additional tests.

These additional tests may fail under corner cases, or circumstances where the programmer would not be able to conceive of the likelihood of potential failure. An example of a corner case may be if an application update were to request an integer from a user, for example, an annual salary, and the user input a character other than an integer, for example, the letter "a". The programmer may have thought to include provisions for what happens if the character input does not match the correct form, however, the input may be used by the application later, for example as part of calculating a 401(k) estimated return based on current salary, where the use of a character other than an integer would cause a failure. Corner cases may not be detected running the tests specified by the programmer, but would be detected running a full set of tests.

The first test profile is detected (block 321). For example, the build server 110 may review the update to detect the programmer specified list of tests to be run (e.g., TestPodFitsSelector). A programmer may specify a list of one or more tests, and may also provide related information such as a ranking or preferred order of testing.

A second file name of a second file updated by the application after the second application update is applied to the application is detected (block 323). For example, after the second application update is applied to application 150A, the name of file 155B, Destination_2, may be detected. The build server may detect this by analyzing the application update. Also, the programmer may include a specified list of files affected by the second application update such that the first test profile includes the second file name.

A second correlation between the second file and the second test is detected by querying the correlation matrix with the second file name (block 325). For example, the build server 110 may query the correlation matrix 180 with the second file name, Destination_2. The correlation matrix 180 may indicate a correlation between Destination_2 and TestAWSDiskConflicts such that on average, when Destination_2 is affected by an application update, TestAWSDiskConflicts fails after four seconds. This correlation may be a result of introspecting prior test results for application 150A by the build server 110. A prior update may have indicated that last time an application update affected Destination_2, TestAWSDiskConflicts failed after four seconds.

A first test plan based on the second correlation and the first test profile is built, where the first test plan includes an ordered list of a second plurality of test names, including the second test name and the first plurality of test names, which are respectively ordered based on a plurality of correlations from the correlation matrix including the second correlation (block 327). For example, build server 110 may build a test plan that includes the detected test from the correlation matrix 180, TestAWSDiskConflicts, and the programmer identified test, TestPodFitsSelector. The test plan may be ordered based on the correlations from the correlation matrix 180. TestAWSDiskConflicts has a correlation of four seconds and may be ordered before TestPodFitsSelector which has no correlation. A test plan may further be ordered based on a normalized frequency of failure. For example, if a test fails after two seconds ten percent of the time, and a second test fails after fifteen seconds eighty percent of the time, the test that fails more often may be ordered before the test that fails faster, based on a normalized frequency of failure. In another example, the tests may be ordered such that the faster test to fail (e.g., a failure after one second with a likelihood of ten percent) may be run first and a slower test having a higher likelihood of failure (e.g., a test that fails after fifteen seconds eighty percent of the time) may be run second because the first test, while having a lower likelihood of failure, can be run much faster.

Further, a test plan may be ordered such that all unit tests are run before any integration tests are run, and that all integration tests are then run before an end-to-end test is run. A test plan may also be ordered to prioritize a full failure of a test over an increase in time to complete a test (e.g., a test that failed, as compared to a test that was expected to take five seconds and took fifteen seconds to complete).

The first test plan is then run based on the ordered list (block 329). For example, the application update, as applied to application 150A, may be subject to a test plan ordered TestAWSDiskConflicts followed by TestPodFitsSelector, and so on.

A first failure of the second test is detected (block 331). For example, build server 110 may detect that TestAWSDiskConflicts failed after five seconds. The test plan may be stopped after the first failure of the second test is detected. By stopping the test plan, CI resources may be conserved and changes may be made by the programmer to the update more quickly. Additionally, other updates by other programmers, or other updates by the same programmer, may be tested while changes are being made to the update based on the detected failure, without the need to wait for the entire test plan to conclude. Stopping the test plan may be known as short circuiting the test plan, which can reduce total build time. Alternatively, the test plan may continue to run after the first failure of the second test.

Continuing on FIG. 3b, a second test result is generated, where the second test result includes the second file name, the second test name, and a second test metric based on the second test (block 333). For example, build server 110 may generate a second test result, indicating that an update that affected Destination_2 failed TestAWSDiskConflicts after five seconds. If the test plan continued to run after the first failure of the second test, a preliminary test result may be generated after the first failure of the second test, where the preliminary test result indicate that an update that affected Destination_2 failed TestAWSDiskConflicts after five seconds. By allowing the test plan to continue to run after the first failure of the second test, the programmer may revise the affected portion of the update, and further determine if additional areas of the update need revisions based on additional tests. This may allow the update to be in final form more rapidly and with fewer iterations through the build server 110. By finding the first test failure faster, (e.g., in the second test run in the ordered test plan, as opposed to the twentieth test run in a non-ordered test plan) hours of additional time may be afforded to the programmer to fix the problems in the application update.

The second correlation between the second file and the second test is updated in the correlation matrix based on the second test metric (block 335). For example, in correlation matrix 180, the correlation between Destination_2 and TestAWSDiskConflicts may be updated to reflect a failure after five seconds. Updating correlation matrix 180 may include adding an additional connection between a file and a test. Alternatively, updating correlation matrix 180 may include augmenting the existing connection between a file and a test such that the connection already existed, but the augmented connection indicates that the connection has been updated an additional time as compared to before the connection was augmented. Also, updating correlation matrix 180 may include storing the second test result in correlation matrix 180. Updating correlation matrix 180 may involve further averaging the second correlation with the second test metric.

The build server 110 then may update a post-application update-hook in correlation matrix 180 when an update is made. The post-application update-hook may describe what test metrics changed when a file was affected by the application update. Thus the present disclosure may advantageously provide a bootstrapping system which may continually update correlation matrix 180 with each update.

Figure 4A:
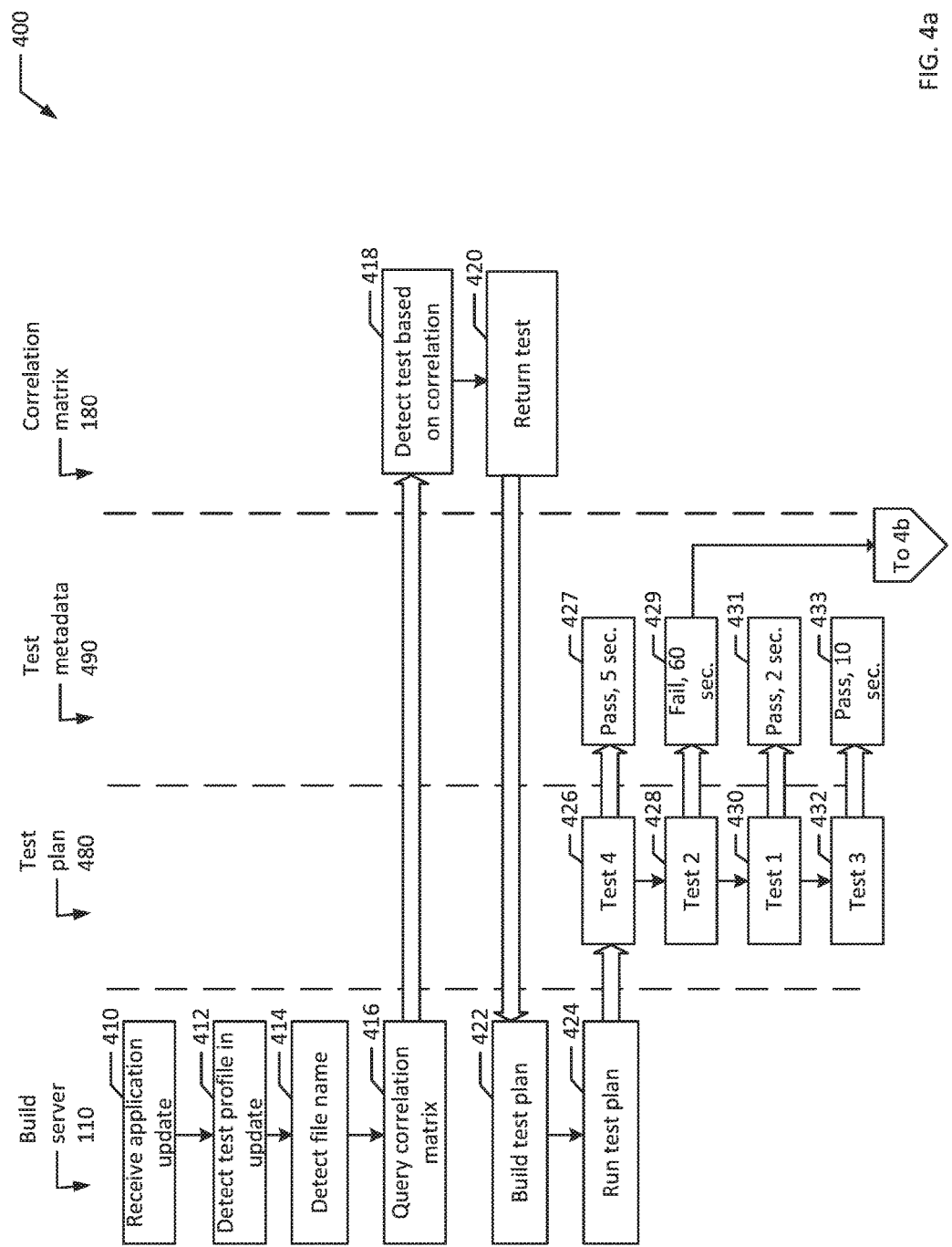
FIGS. 4a and 4b are flow diagrams of update testing according to an example of the present disclosure.
Figure 4B:
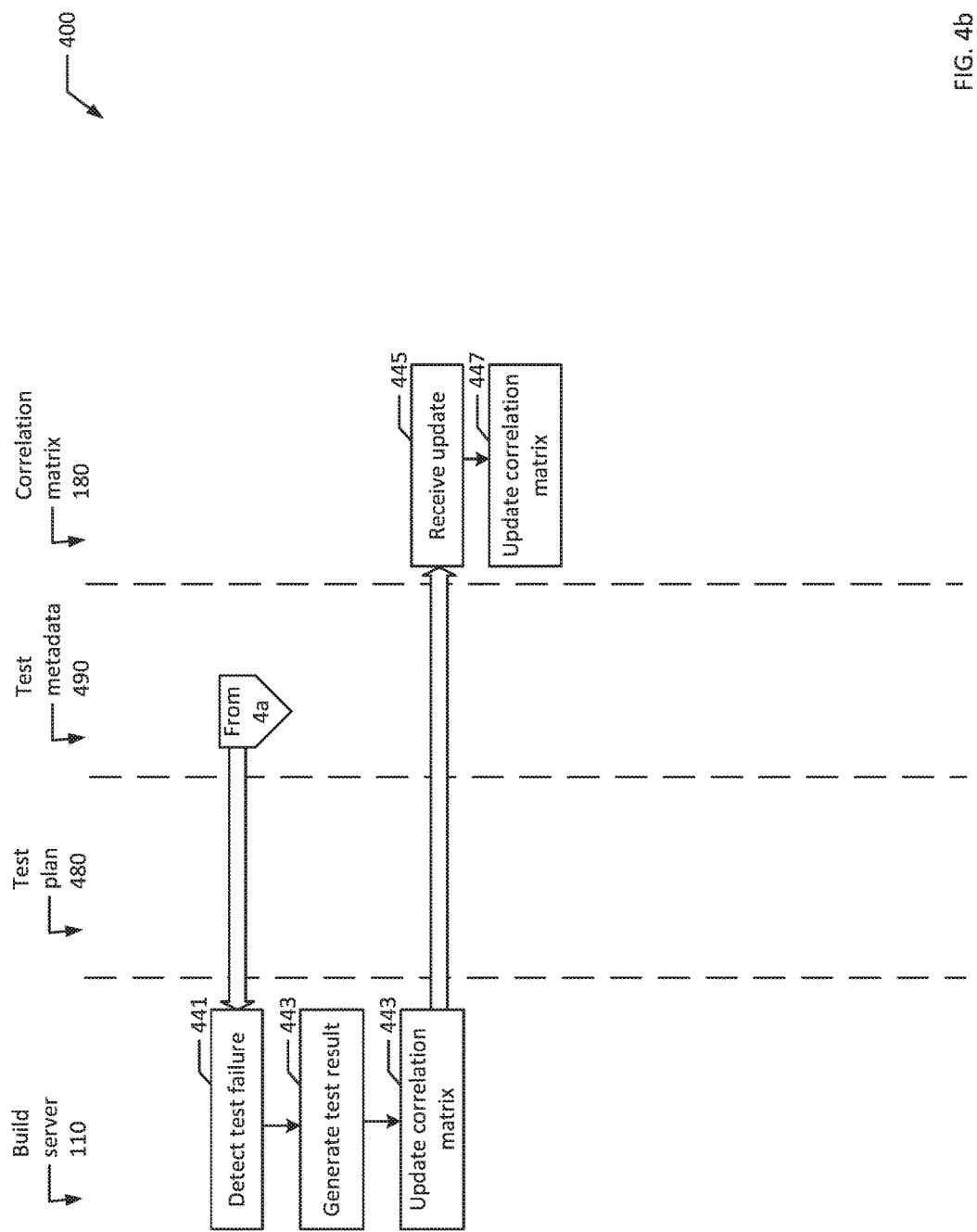

FIGS. 4a and 4b are flow diagrams of update testing according to an example method 400 of the present disclosure. A build server 110 may receive an application update (block 410). For example, build server 110 may receive an update to an application 150 that reads information from a database of all smartphone usage in a geographic area, and returns an analysis of consumer behavior. The update may be a change to how the analysis is returned. The programmer who wrote the update may identify two tests to be run, Test_One and Test_Three, each may be a unit test regarding the section of application 150 where the update itself will be inserted.

The build server 110 may detect a test profile in the update (block 412). For example, build server 110 may detect that the programmer specifically flagged Test_One and Test_Three in a test profile. These two tests may be written into the update or inserted in another fashion such that build server 110 may detect the user specified tests.

The build server 110 may detect a file name (block 414). The file name may be a name of a file that is affected by the application update. For example, the application update may affect a password file named PASS_1 that allows the application to access the database. Build server 110 may detect that the update affects PASS_1 by inspecting the update.

The build server 110 may then query the correlation matrix with the file (block 416). For example, build server 110 may query correlation matrix 180 with the file PASS_1. Build server 110 may present the file name, PASS_1, to correlation matrix 180 or send a request regarding the file name, PASS_1, to correlation matrix 180.

The correlation matrix 180 may detect a test based on a correlation (block 418). For example, correlation matrix 180 may receive the file name, PASS_1, from build server 110 and may detect a correlation between PASS_1 and Test_4 of a pass of seven seconds, as well as a correlation between PASS_1 and Test_2 of a failure of forty-five seconds.

The correlation matrix 180 may return the detected test (block 420). For example, correlation matrix 180 may return Test_4 and Test_2 to build server 110. Correlation matrix 180 may further return the respective correlations of "pass of seven seconds" and "failure of forty-five seconds" to build sever 110.

Correlation matrix 180 may be a DAG such that pointers exist from a file to every test that has a test metric associated with an update that affected the file. For example, if an update affects File_1, and a current execution of Test_Y takes four seconds longer than the last time Test_Y was run, correlation matrix 180 may include a pointer of four seconds originating at File_1 and terminating at Test_Y. The next time an application update affects File_1 and correlation matrix 180 is queried with File_1, correlation matrix 180 may return Test_Y.

In another example, an application update may affect File_2. Test_X may utilize 10% more of the available CPU resources and Test_Y may utilize 3% less of the available CPU resources. Correlation matrix 180 may then include a pointer indicating+10% from File_2 to Test_X and a pointer indicating −3% from File_2 to Test_Y. The next time an application update affects File_2 and correlation matrix 180 is queried with File_2, correlation matrix 180 may return Test_X and the +10% association, as well as returning Test_Y and the −3% association. Alternatively, correlation matrix 180 may only return Test_X and the +10% association, as the association that caused a detrimental change to the system. This change may be detrimental because more resources are used, a longer run time for a test, a failure of the test, or other negative impacting actions on the build system.

The build server 110 may build a test plan (block 422). For example, build server 110 may compile an ordered list of tests for test plan 480, where the ordered list of tests includes the tests detected from the test profile in block 412, Test_1 and Test_3, as well as the returned tests from the correlation matrix in block 420, Test_4 and Test_2, as well as additional unit tests, integration tests and end to end tests. Test plan 480 may be ordered based in part on a likelihood of failure, on a time to failure, on failure results, or on any combination thereof.

For example, test plan 480 may include Test_4 being ordered first, followed by Test_2, followed by Test_1, followed by Test_3. Test_4 and Test_2 were returned from the correlation matrix 180 and are ordered before the programmer identified tests, Test_1 and Test_3. Test_4 may have prior failures of ten seconds and twelve seconds, and a 80% rate of failure for updates that affect PASS_1. Test_2 may have a failure time of three seconds and a pass time of five seconds for updates that affect PASS_1. In this example, Test_4 may be ordered before Test_2, as there is a higher change of failure of Test_4 than Test_2. In another example, Test_2 may be ordered before Test_4 as having a shorter time to failure.

Programmer identified Test_1 and Test_3 may be ordered in test plan 480 in the order submitted by the programmer. Alternatively, Test_1 and Test_3 may be ordered in a random order or in an alphabetical order.

The build server 110 may run the test plan (block 424). Build server 110 may run the tests in test plan 480 in the ordered fashion as defined by the built test plan 480. Each test that is run in test plan 480 may have test metadata 490 that indicates performance metrics or test metrics of the test. For example, test metadata 490 may include a failure time, a pass time, a CPU usage, a memory utilization, or the like with respect to a given test run by the build server.

Test_4 may be run (block 426) and may pass after five seconds (block 427). Then Test_2 may be run (block 428) and may fail after sixty seconds (block 429). In an example, test plan 480 may be stopped after the failure of Test_2. In another example, test plan 480 may continue to run after the failure of Test_2. Continuing with test plan 480, Test_1 may be run (block 430) and may pass after two seconds (block 431). Next, Test_3 may be run (block 432) and may pass after ten seconds (block 433).

Turning to FIG. 4*b*, the build server 110 may detect a test failure (block 441). For example, build server 110 may detect that Test_2 failed. The build server 110 may generate a test result (block 443). The test result may include the name of the file affected by the application update, PASS_1; the test that failed, Test_2; and a test metric, a failure after sixty seconds. The test result may be a preliminary test result if test plan 480 continues to run after the failure is detected. The test result may be a final test result if test plan 480 stops after the failure is detected. A preliminary test result may be followed by an additional final test result at the conclusion of test plan 480.

The build server 110 may update the correlation matrix 180 (block 443). For example, build server 110 may update correlation matrix 180 with the generated test result from block 443 (e.g., a failure after sixty seconds) augmenting, or adding, an additional correlation between PASS_1 and Test_2. Also, updating correlation matrix 180 may include averaging in the test result generated in block 443 with an averaged correlation already stored in correlation matrix 180. In another example, updating correlation matrix 180 may include creating a correlationbetween PASS_1 and Test_2 in correlation matrix indicating that Test_2 failed after sixty seconds when Test_2 was run on an update that affected PASS_1 if such a correlation did not already exist.

The correlation matrix 180 may receive an update from build server 110 (block 445). The correlation matrix may be updated with the test result (block 447). For example, correlation matrix 180 may be updated such that the next time an application update affects PASS_1 and PASS_1 is queried to correlation matrix 180, Test_2 is returned based on the second correlation from the test result between the file, PASS_1, and the test Test_2.

In an example, build server 110 may receive a third update. The third update may include a second test profile written into the update that includes a second plurality of test names designated as test failure candidates. The programmer may have identified Test_2, Test_1 and Test_7 as test failure candidates. Build server 110 may then detect the second test profile in the application update. Build server may detect a third file name, PASS_2, which is updated by the application after the update is applied to the application. For example, the update may be an additional update to how the analysis is returned and may affect how the application accesses the PASS_2 file. Build server 110 may then query correlation matrix 180 with the third file name, PASS_2, to detect a correlation between PASS_2, and tests that have been failed in the past when updates affected PASS_2. Correlation matrix 180 may return Test_5 as a past test failure, including a correlation that past failures have taken an average of fifteen seconds.

Build server 110 may further detect that the update affects how application 150A interacts with file PASS_1 after the update has been applied to application 150A. Build server 110 may query the correlation matrix with PASS_1 and detect that PASS_1 has a correlation with Test_2 such that the average failure time of Test_2 with updates affecting the interaction with PASS_1 is forty-five seconds.

Build server 110 may then build a second test plan based on at least a correlation (e.g., the correlation between PASS_1 and Test_2 as returned from the correlation matrix) and the second test profile, where the second test plan includes a second ordered list of a third plurality of test names including the third test name and a second plurality of test names, and where the third test name and the second plurality of test names are respectively ordered based on at least a second plurality of correlations from the correlation matrix including the third correlation. For example, build server 110 may include Test_1, Test_2, Test_5 and Test_7 in the second test plan. The programmer identified Test_2, Test_1 and Test_7 as test failure candidates, Test_2 was returned from correlation matrix 180 based on querying with PASS_1, and Test_5 was returned from correlation matrix 180 based on querying with PASS_2. The test plan may further be ordered based on the correlations returned from correlation matrix 180. For example, Test_2 and Test_5 may be ordered before Test_1 and Test_7 in the second test plan. Further, Test_2 may be ordered before Test_5 because it was both specified by the programmer and returned by correlation matrix 180 with an average failure time of forty-five seconds. The second test plan may be ordered such that Test_2 is first, followed by Test_5, followed by Test_1, followed by Test_7.

Build server 110 may then run the second test plan in the order the test plan indicates. Build server 110 may detect a failure of Test_5 after fifteen seconds. Build server 110 may generate a test result that includes the third file name, PASS_2; the third test name, Test_5; and a third test metric, failure after fifteen seconds. The test result may also include that the update affected file name PASS_1, and that Test_5 failed after fifteen seconds when Test_5 was run on an update that affected PASS_1.

Correlation matrix 180 may be updated with the correlation between PASS_2 and Test_5, such that correlation matrix 180 will indicate that an update that affected PASS_2 led to a failure of Test_5 after fifteen seconds. Correlation matrix 180 may be further updated with a correlation between PASS_1 and Test_5, such that correlation matrix 180 will indicate that an update that affected PASS_1 led to a failure of Test_5 after fifteen seconds.

Each subsequent update to an application may further update correlation matrix 180 with additional correlations between affected files and tests based on test metrics. The more iterations the system provides, the greater the optimization available for ordering future test plans. A test may have failed due to an error known as a flake that is not connected to the update itself. The present system may remove the relevance of flakes in a CI testing environment by storing all test metrics, and as more tests are run, the importance of a flake failure is reduced, and such tests may be ordered lower. By reducing the impact of flake failures, the present disclosure provides for faster release times for application updates.

Figure 5:
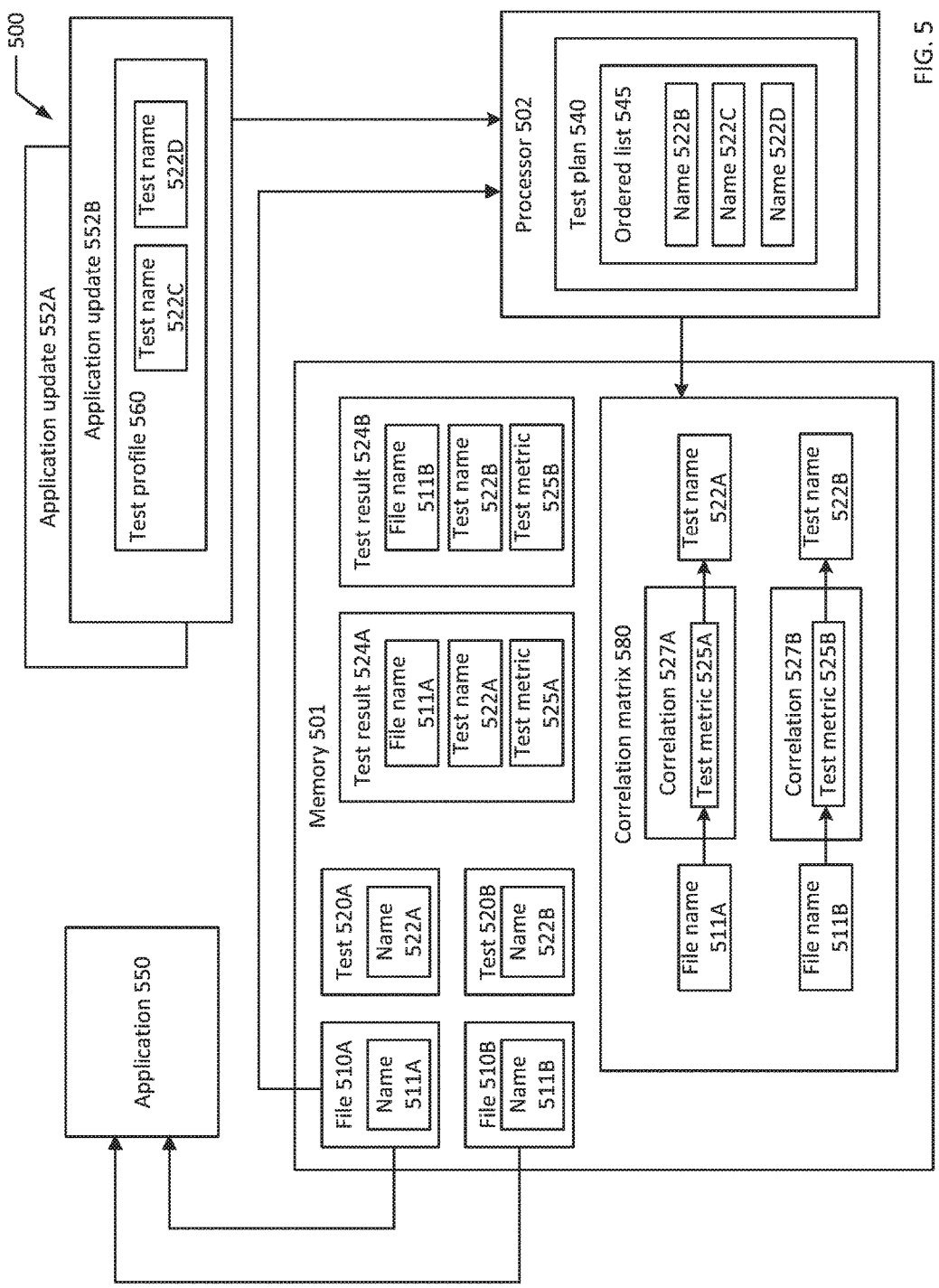
FIG. 5 is a block diagram of an update testing system according to an example of the present disclosure.

FIG. 5 is a block diagram of an update testing system according to an example of the present disclosure. System 500 includes memory 501 and processor 502. Memory 501 stores a plurality of files 510A-B. The plurality of files 510A-B includes a first file 510A and a second file 510B that are used by application 550. Each file 510A-B has a respective file name 511A-B. Memory 501 also stores tests 520A-B, which include a first test 510A and a second test 510B that are used to test application 550. Each test 510A-B has a respective test name 522A-B. Memory 501 also stores test results 524A-B. Test results 524A-B include test result 524A, which includes file name 511A, test name 522A, and test metric 525A based on the test 522A. Memory 501 also stores correlation matrix 580, which associates file name 511A and test name 522A with a correlation 527A between file name 511A and test name 522A based on test metric 525A. Correlation matrix 580 also associates file name 511B and test name 522B with a correlation 527B between file name 511B and test name 522B based on test metric 525B.

Processor 502 receives application updates 552A-B. Application update 552B includes test profile 560, which includes a plurality of test names 522C-D designated as test failure candidates. Processor 502 detects test profile 560 and file name 511B. File 510B is updated by application 550 after application update 552B is applied to application 550. Processor 502 further detects, by querying correlation matrix 580 with file name 511B, a correlation 527B between file name 511B and test name 522B.

Processor 502 builds test plan 540 based on the correlation 527B between file name 511B and test name 522B and test profile 560. Test plan 540 includes an ordered list 545 of test names 522B, 522C, and 522D. Test names 522B-D are respectively ordered based on correlations 527A-B from correlation matrix 580 including the correlation 527B between file name 511B and test name 522B.

Processor 502 runs test plan 540 based on the ordered list 545 of test plan 540. Processor 502 detects a test failure of test 520B and generates test result 524B, which includes file name 511B, test name 522B and test metric 525B. Processor 502 updates correlation matrix 580 with the correlation 527B between file name 511B and test name 522B, based on test metric 525B.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention claimed is:

1. A method comprising:
storing, in a memory, a plurality of files, the plurality of files including a first file and a second file that are used by an application, wherein each file in the plurality of files has a respective file name;
storing, in the memory, a plurality of tests, the plurality of tests including a first test and a second test that are used to test the application, wherein each test in the plurality of tests has a respective test name;
storing, in the memory, a plurality of test results, the plurality of test results including a first test result, which includes a first file name of the first file, which was updated by the application after a first update was applied to the application, a first test name of the first test, and a first test metric based on the first test;
storing, in the memory, a correlation matrix, which associates the first file name and the first test name with a first correlation between the first file and the first test based on the first test metric;
receiving a second update to the application, wherein the second update includes a first test profile including a first plurality of test names designated as test failure candidates;
detecting the first test profile;
detecting a second file name of the second file, which is updated by the application after the second update is applied to the application;
detecting, by querying the correlation matrix with the second file name, a second correlation between the second file and the second test;
building a first test plan based on at least the second correlation and the first test profile, wherein the first test plan includes an ordered list of a second plurality of test names including the second test name and the first plurality of test names, and wherein the second test name and the first plurality of test names are respectively ordered based on at least a plurality of correlations from the correlation matrix including the second correlation;
running the first test plan based on the ordered list;
detecting a first failure of the second test;
generating a second test result, which includes the second file name, the second test name, and a second test metric based on the second test; and
updating, in the correlation matrix, the second correlation between the second file and the second test, based on the second test metric.

2. The method of claim 1, wherein the first test plan is stopped after the first failure of the second test.

3. The method of claim 1, wherein a preliminary test result is generated after the failure of the second test and wherein the first test plan continues to run after the first failure of the second test.

4. The method of claim 1, wherein the first test profile includes the second file name.

5. The system of claim 1, wherein each of the plurality of test results are stored in the correlation matrix.

6. The method of claim 1, wherein the first correlation includes at least a failure time and a pass time.

7. The method of claim 1, wherein the first correlation includes an average time.

8. The method of claim 1, wherein the first correlation includes a plurality of failure times.

9. The method of claim 1, further comprising:
receiving a third update to the application, wherein the third update includes a second test profile including a second plurality of test names designated as test failure candidates;
detecting the second test profile;
detecting a third file name of a third file, which is updated by the application after the third update is applied to the application;
detecting, by querying the correlation matrix with the third file name, a third correlation between the third file and a third test;
building a second test plan based on at least the third correlation and the second test profile, wherein the second test plan includes a second ordered list of a third plurality of test names including the third test name and a second plurality of test names, and wherein the third test name and the second plurality of test names are respectively ordered based on at least a second plurality of correlations from the correlation matrix including the third correlation;
running the second test plan based on the second ordered list;
detecting a second failure of the third test;
generating a third test result, which includes the third file name, the third test name, and a third test metric based on the third test; and
updating, in the correlation matrix, the third correlation between the third file and the third test, based on the third test metric.

10. The method of claim 1, wherein the correlation matrix includes a test DAG for each file in the plurality of files.

11. A system comprising:
a memory, wherein the memory stores:
a plurality of files, the plurality of files including a first file and a second file that are used by an application, wherein each file in the plurality of files has a respective file name,
a plurality of tests, the plurality of tests including a first test and a second test that are used to test the application, wherein each test in the plurality of tests has a respective test name,
a plurality of test results, the plurality of test results including a first test result, which includes a first file name of the first file, which was updated by the application after a first update was applied to the application, a first test name of the first test, and a first test metric based on the first test, and
a correlation matrix, which associates the first file name and the first test name with a first correlation between the first file and the first test based on the first test metric; and
a processor, wherein the processor:
receives a second update to the application, wherein the second update includes a first test profile including a first plurality of test names designated as test failure candidates;
detects the first test profile;
detects a second file name of the second file, which is updated by the application after the second update is applied to the application;

detects, by querying the correlation matrix with the second file name, a second correlation between the second file and the second test;
builds a first test plan based on at least the second correlation and the first test profile, wherein the first test plan includes an ordered list of a second plurality of test names including the second test name and the first plurality of test names, and wherein the second test name and the first plurality of test names are respectively ordered based on at least a plurality of correlations from the correlation matrix including the second correlation;
runs the first test plan based on the ordered list;
detects a first failure of the second test;
generates a second test result, which includes the second file name, the second test name, and a second test metric based on the second test; and
updates, in the correlation matrix, the second correlation between the second file and the second test, based on the second test metric.

12. The system of claim 11, wherein the first test plan is stopped after the first failure of the second test.

13. The system of claim 11, wherein the processor generates a preliminary test result after the first failure of the second test and continues to run the first test plan after the first failure of the second test.

14. The system of claim 11, wherein updating the correlation matrix includes storing the second test result in the correlation matrix.

15. The system of claim 11, wherein, after receiving the second update, the processor:
detects the first file name of first file, which is updated by the application after the second update is applied to the application; and
detects, by querying the correlation matrix with the first file name, the first correlation between the first file and the second test, wherein the first test plan is further based on the first correlation.

16. The system of claim 11, wherein the processor further:
receives a third update to the application, wherein the third update includes a second test profile including a second plurality of test names designated as test failure candidates;
detects the second test profile;
detects a third file name of a third file, which is updated by the application after the third update is applied to the application;
detects, by querying the correlation matrix with the third file name, a third correlation between the third file and a third test;
builds a second test plan based on at least the third correlation and the second test profile, wherein the second test plan includes a second ordered list of a third plurality of test names including the third test name and a second plurality of test names, and wherein the third test name and the second plurality of test names are respectively ordered based on at least a second plurality of correlations from the correlation matrix including the third correlation;
runs the second test plan based on the second ordered list;
detects a second failure of the third test;
generates a third test result, which includes the third file name, the third test name, and a third test metric based on the third test; and
updates, in the correlation matrix, the third correlation between the third file and the third test, based on the third test metric.

17. The system of claim 11, wherein the first test plan is further ordered such that a unit test is run before an integration test, and an integration test is run before an end-to-end test.

18. The system of claim 11, wherein the correlation matrix includes a first test direct acyclic graph (DAG).

19. The system of claim 11, wherein the first correlation includes a plurality of failure times.

20. A non-transitory computer readable medium storing instructions,
which when executed, cause a build server to:
store, a plurality of files, the plurality of files including a first file and a second file that are used by an application, wherein each file in the plurality of files has a respective file name;
store a plurality of tests, the plurality of tests including a first test and a second test that are used to test the application, wherein each test in the plurality of tests has a respective test name;
store a plurality of test results, the plurality of test results including a first test result, which includes a first file name of the first file, which was updated by the application after a first update was applied to the application, a first test name of the first test, and a first test metric based on the first test;
store a correlation matrix, which associates the first file name and the first test name with a first correlation between the first file and the first test based on the first test metric;
receive a second update to the application, wherein the second update includes a first test profile including a first plurality of test names designated as test failure candidates;
detect the first test profile;
detect a second file name of the second file, which is updated by the application after the second update is applied to the application;
detect, by querying the correlation matrix with the second file name, a second correlation between the second file and the second test;
build a first test plan based on at least the second correlation and the first test profile, wherein the first test plan includes an ordered list of a second plurality of test names including the second test name and the first plurality of test names, and wherein the second test name and the first plurality of test names are respectively ordered based on at least a plurality of correlations from the correlation matrix including the second correlation;
run the first test plan based on the ordered list;
detect a first failure of the second test;
generate a second test result, which includes the second file name, the second test name, and a second test metric based on the second test; and
update, in the correlation matrix, the second correlation between the second file and the second test, based on the second test metric.

* * * * *